(12) United States Patent
Safstrom (10) Patent No.: US 10,913,449 B2
(45) Date of Patent: Feb. 9, 2021

(54) VEHICLE ELECTRONIC STABILITY CONTROL SYSTEM INCLUDING BACK-UP WHEEL SPEED DETECTION

(71) Applicant: Robert Bosch GmbH, Stuttgart (DE)

(72) Inventor: David Safstrom, Toledo, OH (US)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 16/170,838

(22) Filed: Oct. 25, 2018

(65) Prior Publication Data

US 2019/0135272 A1    May 9, 2019

Related U.S. Application Data

(60) Provisional application No. 62/583,779, filed on Nov. 9, 2017.

(51) Int. Cl.
| | |
|---|---|
| *B60W 30/02* | (2012.01) |
| *B60T 8/171* | (2006.01) |
| *B60L 50/50* | (2019.01) |
| *B60T 8/1755* | (2006.01) |
| *H02K 7/14* | (2006.01) |

(Continued)

(52) U.S. Cl.
CPC ............. *B60W 30/02* (2013.01); *B60L 15/20* (2013.01); *B60L 15/32* (2013.01); *B60L 50/50* (2019.02); *B60R 16/0231* (2013.01); *B60T 8/171* (2013.01); *B60T 8/176* (2013.01); *B60T 8/1755* (2013.01); *G01P 3/481* (2013.01); *H02K 7/14* (2013.01); *H02K 11/0094* (2013.01); *H02K 11/215* (2016.01); *B60T 2270/10* (2013.01); *B60T 2270/30* (2013.01); *B60T 2270/402* (2013.01); *B60T 2270/416* (2013.01); *B60W 2520/28* (2013.01); *B60Y 2200/91* (2013.01); *G01P 3/487* (2013.01)

(58) Field of Classification Search
CPC ............. B60W 30/02; B60W 2520/28; H02K 11/215; H02K 7/14; H02K 11/0094; B60L 50/50; B60L 15/20; B60L 15/32; B60R 16/0231; B60T 8/171; B60T 8/1755; B60T 8/176; B60T 2270/10; B60T 2270/30; B60T 2270/402; B60T 2270/416; B60Y 2200/91; G01P 3/481; G01P 3/487
USPC ......................................................... 701/22
See application file for complete search history.

(56) References Cited

U.S. PATENT DOCUMENTS

| | | |
|---|---|---|
| 6,636,788 B2 | 10/2003 | Tamagawa et al. |
| 9,248,745 B1 | 2/2016 | Bachmann |

(Continued)

*Primary Examiner* — Gertrude Arthur Jeanglaude
(74) *Attorney, Agent, or Firm* — Kelly McGlashen; Maginot, Moore & Beck LLP (57) ABSTRACT

A vehicle control system includes a powertrain electronic control unit and an electronic stability control unit that is connected to the powertrain electronic control unit via a vehicle communication bus. The vehicle powertrain includes a wheel, a wheel speed sensor that is configured to detect a speed of the wheel, an electric motor that is configured to drive the wheel, and an electric motor speed sensor that is configured to detect the speed of the electric motor. If the wheel speed sensor is operating normally, the electronic stability control unit controls the vehicle based on an output of the wheel speed sensor. However, if the wheel speed sensor is not operating normally, the electronic stability control unit controls the vehicle based on an output of the electric motor speed sensor.

11 Claims, 6 Drawing Sheets

(51) Int. Cl.
  *H02K 11/215*  (2016.01)
  *B60L 15/20*   (2006.01)
  *B60L 15/32*   (2006.01)
  *B60R 16/023*  (2006.01)
  *B60T 8/176*   (2006.01)
  *G01P 3/481*   (2006.01)
  *H02K 11/00*   (2016.01)
  *G01P 3/487*   (2006.01)

(56) References Cited

U.S. PATENT DOCUMENTS

| | | | |
|---|---|---|---|
| 9,656,574 B2 | 5/2017 | Li et al. | |
| 2005/0035758 A1* | 2/2005 | Waszkowski | B60T 8/171 |
| | | | 324/207.25 |
| 2006/0042074 A1* | 3/2006 | Stork | F01L 1/34 |
| | | | 29/622 |
| 2010/0025131 A1 | 2/2010 | Gloceri et al. | |

* cited by examiner

VEHICLE ELECTRONIC STABILITY CONTROL SYSTEM INCLUDING BACK-UP WHEEL SPEED DETECTION

BACKGROUND

In electric vehicles, as in traditional vehicles, maintaining control over the rotational speed of the wheels is critical to maintaining traction with the road surface. A loss of friction can occur from excessive acceleration or deceleration (i.e. hard braking). When accelerating, the wheels can receive excessive torque from the electric motor. This may cause a loss of traction with the road surface and wheel spin. Similarly, when the wheels receive excessive braking force, the wheels may lose traction with the road surface. Modern vehicle systems strive to eliminate a loss of traction and wheel spin with vehicle electronic stability control systems. The vehicle electronic stability control systems may include, for example, antilock braking, traction control, stability control and/or other functions.

Electronic stability control systems are limited in effectiveness by the ability of the vehicle's sensors to determine the vehicle's behavior. For example, the electronic stability control system uses wheel speed information determined by a wheel speed sensor to perform antilock braking, traction control, and stability control functions. However, if the wheel speed sensor malfunctions and/or is unable to provide a signal to the system, the electronic stability control system may operate in a degraded manner or may turn off. Therefore, in order to avoid degraded or lost control functions, it is desirable to ensure that the electronic stability control system receives accurate wheel speed information even in the event a wheel speed signal becomes unavailable.

SUMMARY

For vehicles in which wheels are driven by an electric motor, for example in electric or hybrid vehicles, the signals for electric motor speed can be used by the electronic stability control system as a back-up signal by replacing the wheel speed sensor signal in the case the wheel speed sensor signal is unavailable or operating abnormally. The signals for electric motor speed are already available to use for most electric vehicles via the vehicle communication bus. By maintaining antilock braking, traction control, stability control or other vehicle control functions during wheel speed sensor malfunctions, vehicle safety is improved.

DETAILED DESCRIPTION

Figure 1:
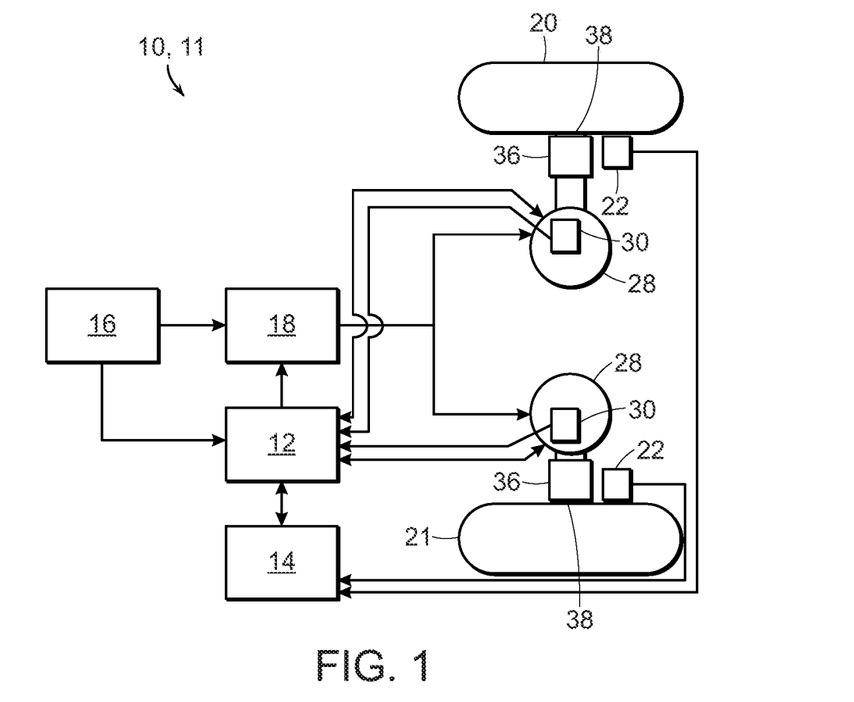
FIG. 1 is schematic diagram illustrating a vehicle control system for powertrain of an electric vehicle including an electric motor connected to each of the right and at the left drive wheels, each of the left and right drive wheels being driven by the corresponding electric motor.

FIG. 1 illustrates a vehicle control system 10 for a powertrain 11 of an electric vehicle. In the powertrain 11, drive wheels, for example the rear wheels 20, 21, are used to drive the vehicle and each of the right rear wheel 20 and the left rear wheel 21 is driven by an electric motor 28. A battery 16 is electrically coupled to a drive inverter 18, which is electrically coupled to each electric motor 28. A powertrain electronic control unit 12 (ECU) is connected to the battery 16, the drive inverter 18, and the electric motors 28. The electric motors 28 each include a motor shaft 34 that is mechanically coupled to a drive shaft 38 via a gear set 36. The drive shaft 38 is mechanically coupled to the corresponding drive wheel 20, 21. However, in other embodiments, the gear set 36 may be omitted and motor shaft 34 is also the drive shaft 38.

Figure 2:
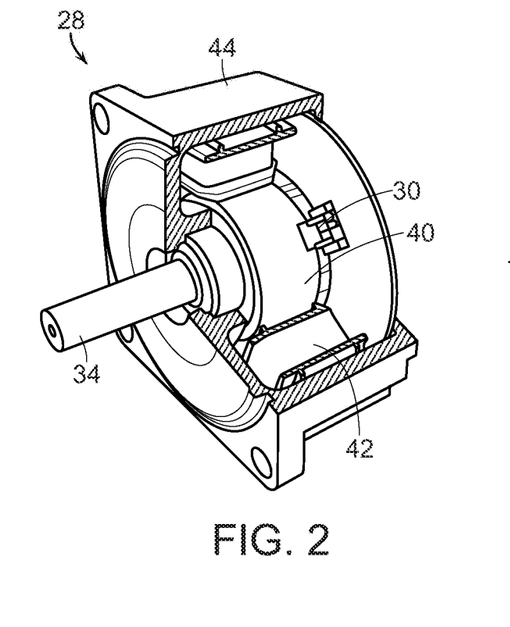
FIG. 2 illustrates an electric motor speed sensor mounted within an electric motor so as to detect rotational speed and direction of a rotor of the electric motor.
Figure 3:
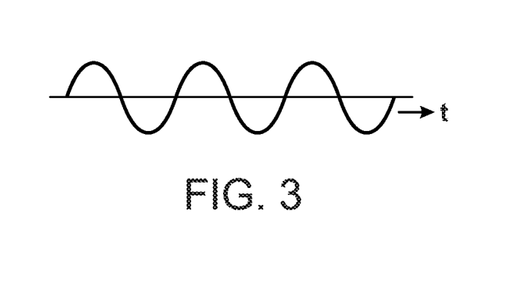
FIG. 3 illustrates an output signal of the electric motor speed sensor of FIG. 2.

Referring to FIGS. 2 and 3, the electric motors 28 can be any type of electrical motor that has sufficient horsepower to drive the vehicle, including, for example, an alternating current (AC) motor or an electrically commutated (EC) motor. Each electric motor 28 is controlled by the powertrain electronic control unit 12 via a vehicle communication bus. The vehicle communication bus is an internal communications network that provides communication between the electronic components within the vehicle. The communication bus employed by the vehicle control system 10 may be any appropriate communication bus such as a Controller Area Network (CAN), Local Interconnect Network (LIN), FlexRay, etc.

Each electric motor 28 includes an electric motor speed sensor 30 that is disposed within a housing 44 of the electric motor 28 and is configured to detect a speed of the electric motor 28. In some embodiments, the motor speed sensor 30 may be a rotor position sensor that detects a positon of the motor rotor 40 with respect to the motor stator 42, and then the speed of the electric motor 28 is calculated as a function of change in rotor position and time. In the illustrated embodiment, the electric motor speed sensor 30 is a Hall effect sensor that is mounted within the motor housing 44 adjacent to the motor rotor 40. When the rotor magnetic poles pass the electric motor speed sensor 30, a high (for one pole) or low (for the opposite pole) signal is generated. As seen in FIG. 3, an output signal from the electric motor speed sensor 30 is a sinusoidal signal that alternates between positive and negative maximums. The electric motor speed sensor 30 is electrically connected to the powertrain electronic control unit 12 via the vehicle communication bus.

The electric motor speed sensor 30 accurately detects the rotational position of the motor rotor 40 relative to the motor stator 42. In addition, the electric motor speed sensor 30 accurately detects the direction of rotation of the motor rotor 40 relative to the motor stator 42.

Referring again to FIG. 1, during acceleration, the battery 16 provides power to the drive inverter 18 by supplying the drive inverter 18 with direct current (DC). The drive inverter 18 converts DC into alternating current (AC) for use in the electric motors 28. The electric motors 28 convert electric power into mechanical power by driving the motor shaft 34. The powertrain ECU 12 communicates with the drive inverter 18 and the battery 16 to manage the power delivery to and from the electric motors 28.

The vehicle control system 10 further includes a vehicle electronic stability control unit 14. The vehicle electronic stability control unit 14 is configured to provide, for example, one or more of antilock braking, traction control, stability control and/or other vehicle control functions. The stability control unit 14 automatically controls the brakes (not shown) of individual wheels to control the heading of the vehicle for example preventing the heading from changing too quickly (spinning out) or not quickly enough (plowing out). To this end, the vehicle electronic stability control unit 14 receives as direct inputs signals from the wheel speed sensors 22, a brake pressure sensor (not shown) and a brake light switch (not shown). As used herein, the term "direct input" refers to a condition in which a sensor is directly electrically connected via a line that is not included in the vehicle communication bus, or is directly placed on the circuit board of the stability control unit 14. The vehicle electronic stability control unit 14 receives other signals from the vehicle communication bus, typically including for example engine signals related to engine speed, engine torque, throttle position, etc., a steering angle sensor, and signals related to inertia measurement including outputs from a yaw rate sensor, a longitudinal acceleration sensor, a lateral acceleration sensor, etc.

Figure 4:
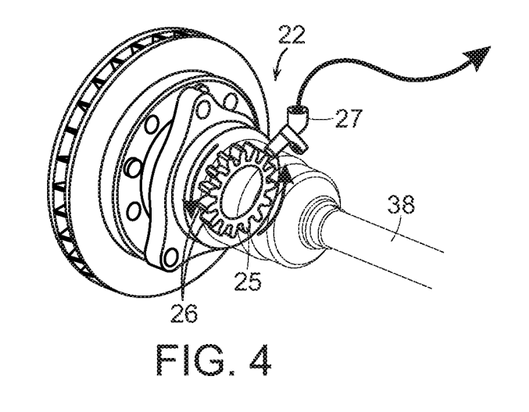
FIG. 4 illustrates a wheel speed sensor mounted on a wheel hub of a drive wheel.
Figure 5:
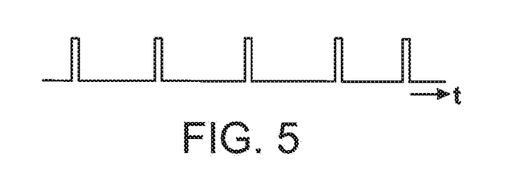
FIG. 5 illustrates an output signal of the wheel speed sensor of FIG. 4.

Referring to FIGS. 4 and 5, in the illustrated embodiment, the wheel speed sensors 22 each include a metal reluctor wheel or tone ring 25 and a magnetic detector 27. The tone ring 25 is annular and includes outwardly protruding, equidistantly spaced teeth 26. Although the illustrated tone ring 25 includes 48 teeth, the tone ring 25 may include a greater or fewer number of teeth 26. The tone ring 25 surrounds, and rotates concurrently with, the drive shaft 38 and wheel 20, 21. The detector 27 is fixed to the vehicle and thus does not rotate with the drive shaft 38. In addition, the detector 27 is disposed facing the tone ring 25 with a small gap therebetween (about 1 mm) so as to detect individual metal teeth 26 as the wheel rotates. As seen in FIG. 5, an output signal from the detector 27 is formed of discrete pulses that are spaced apart in time corresponding to the passage of individual teeth past the detector 27.

Although the wheel speed sensors 22 provide reliable and accurate detection of wheel speeds at normal vehicle traveling speeds, the wheel speed sensors 22 have poor resolution at very low vehicle speeds, for example at speed that are less than 1 to 2 kilometers per hour. In addition, the wheel speed sensor 22 can also be unreliable in detecting the direction of rotation of the tone ring 25. For example, the detector 27 must see multiple teeth to ensure that it is not detecting the same tooth multiple times and make a determination between a wheel that is rocking back and forth and a wheel that is moving in a single direction.

The vehicle electronic stability control unit 14 receives output from the wheel speed sensors 22 of each wheel 20, 21 and compares the wheel speeds of each wheel 20, 21 to determine if wheel slip is occurring. Prior to comparing the wheel speeds of each wheel 20, 21, the electronic stability control unit 14 determines whether the wheel speed sensor 22 is providing an output signal in a predetermined range, for example in a range corresponding to a normal operating range of the wheel speed sensor 22. If the vehicle electronic stability control unit 14 determines that the wheel speed sensor 22 is providing an output signal in the predetermined range, the wheel speed sensor 22 is considered to be operating normally. In this case, the electronic stability control unit 14 controls the electronic stability control devices, including one or more of antilock braking, traction control, stability control and/or other vehicle control functions, based on an output of the wheel speed sensor 22, along with various other sensors in accordance with known operation of these systems and devices.

However, if the vehicle electronic stability control unit 14 determines that the wheel speed sensor 22 is not providing an output signal and/or is not providing an output signal in the predetermined range (e.g., in a range corresponding to a normal operating range of the wheel speed sensor 22), the wheel speed sensor 22 is considered to be operating abnormally. In this case, the electronic stability control unit 14 controls the electronic stability control devices, including one or more of antilock braking, traction control, stability control and/or other vehicle control functions, based on an output of the electric motor speed sensor 30, along with various other sensors in accordance with known operation of these systems and devices. Thus, the electric motor speed sensor 30 serves as a back-up sensor for the wheel speed sensor 22. By using the electric motor speed sensor 30 as a back-up sensor for the wheel speed sensor 22, degradation of the operation of the electronic stability control device or shut down of the electronic stability control devices due to abnormal function of the wheel speed sensor 22 is avoided.

Figure 6:
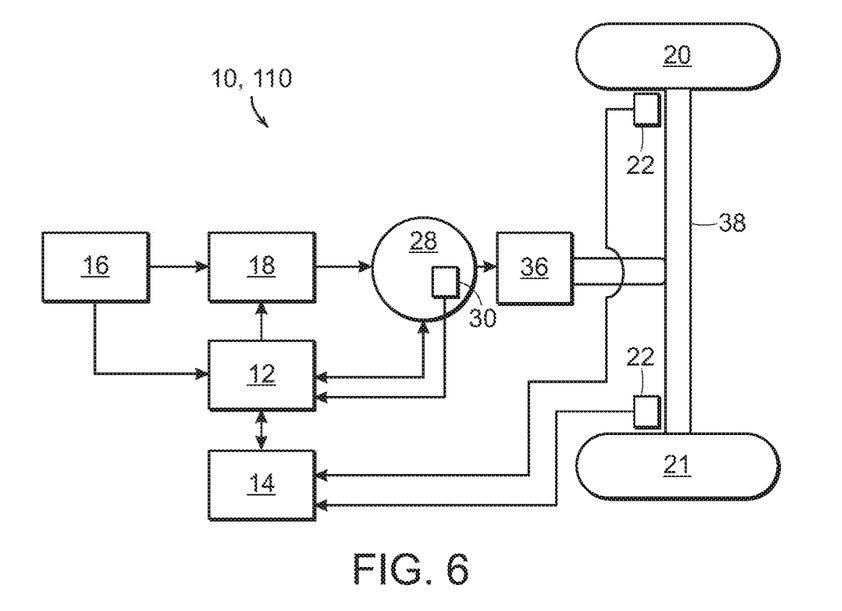
FIG. 6 is schematic diagram illustrating an alternative embodiment powertrain controlled by a vehicle control system of an electric vehicle including a single electric motor that is connected to and drives both the right and left drive wheels.

Although the vehicle control system 10 has been described herein with respect to the powertrain 11 in which each of the drive wheels 20, 21 is driven by an electric motor 28, the vehicle control system is not limited to being used with this powertrain 11. For example, in some embodiments, the vehicle control system 10 is used with an alternative embodiment powertrain 110 in which both of the drive wheels 20, 21 are driven by single, common electric motor 28 (see FIG. 6). In the alternative embodiment powertrain 110, common elements are referred to using common reference numbers. As in the previously described embodiment, during normal operation of the wheel speed sensor 22, the electronic stability control unit 14 controls the electronic stability control devices based on an output of the wheel speed sensor 22, along with various other sensors in accordance with known operation of these systems and devices. However, during abnormal operation of the wheel speed sensor 22, the electronic stability control unit 14 controls the electronic stability control devices based on an output of the electric motor speed sensor 30, along with various other sensors in accordance with known operation of these systems and devices.

Figure 7:
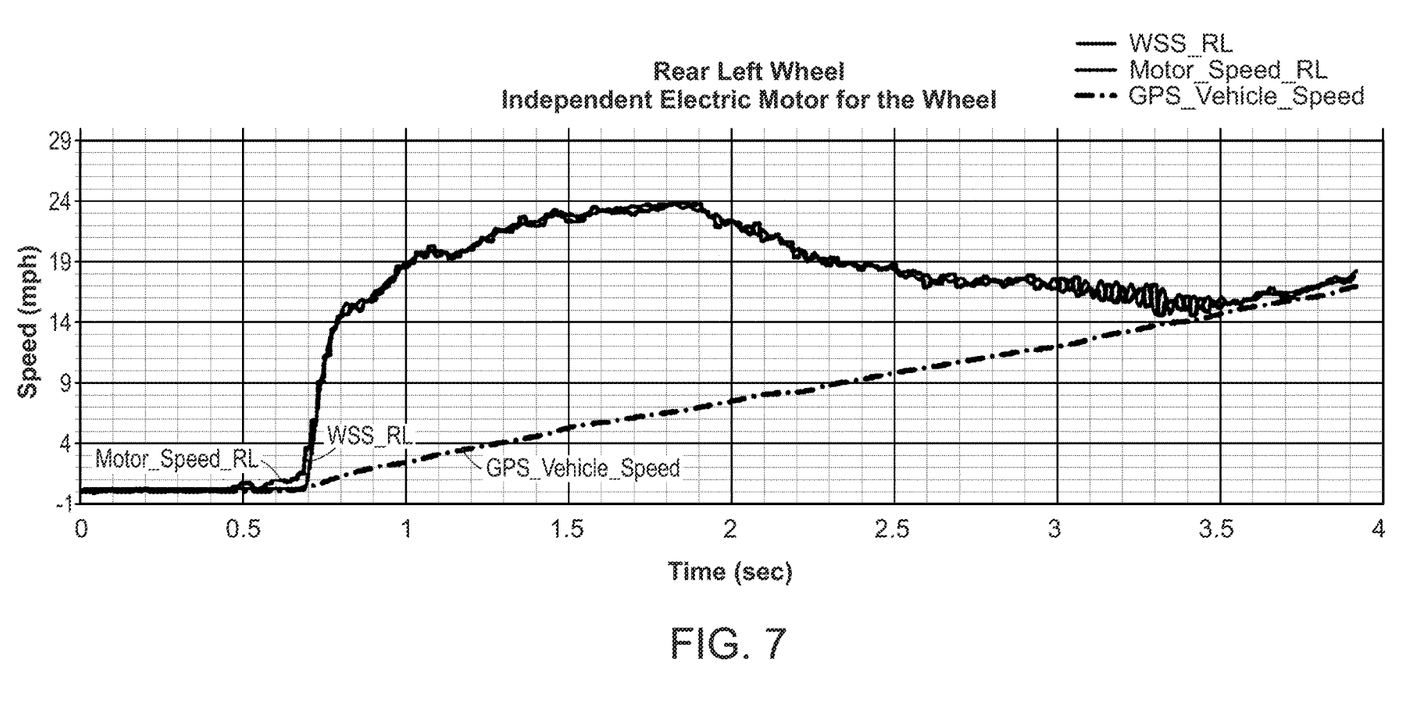
FIG. 7 is a graph of vehicle speed versus time illustrating the wheel speed, the electric motor speed and vehicle speed for a rear left wheel having a dedicated electric motor.
Figure 8:
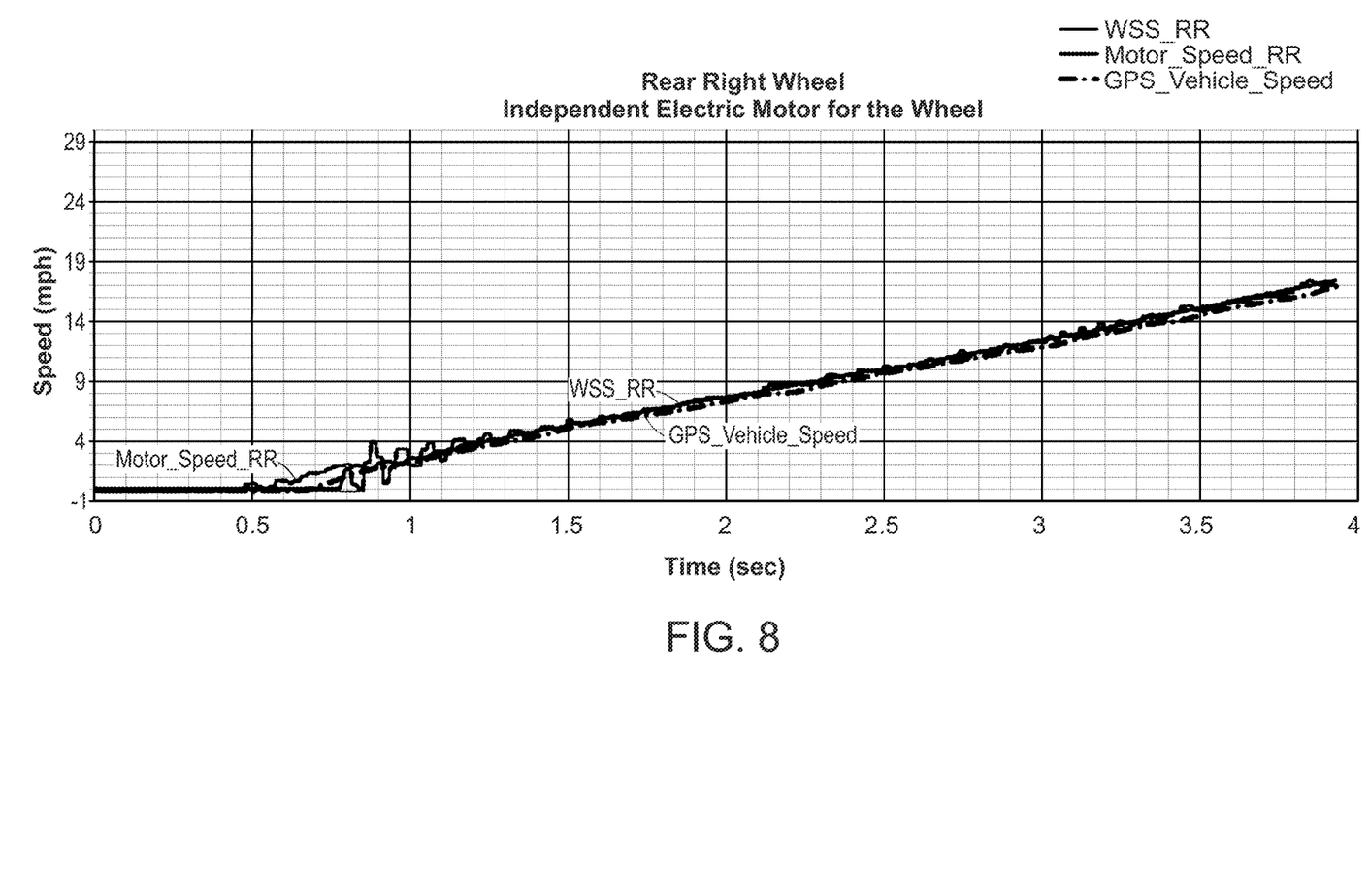
FIG. 8 is a graph of vehicle speed versus time illustrating the wheel speed, the electric motor speed and vehicle speed for a rear right wheel having a dedicated electric motor.
Figure 9:
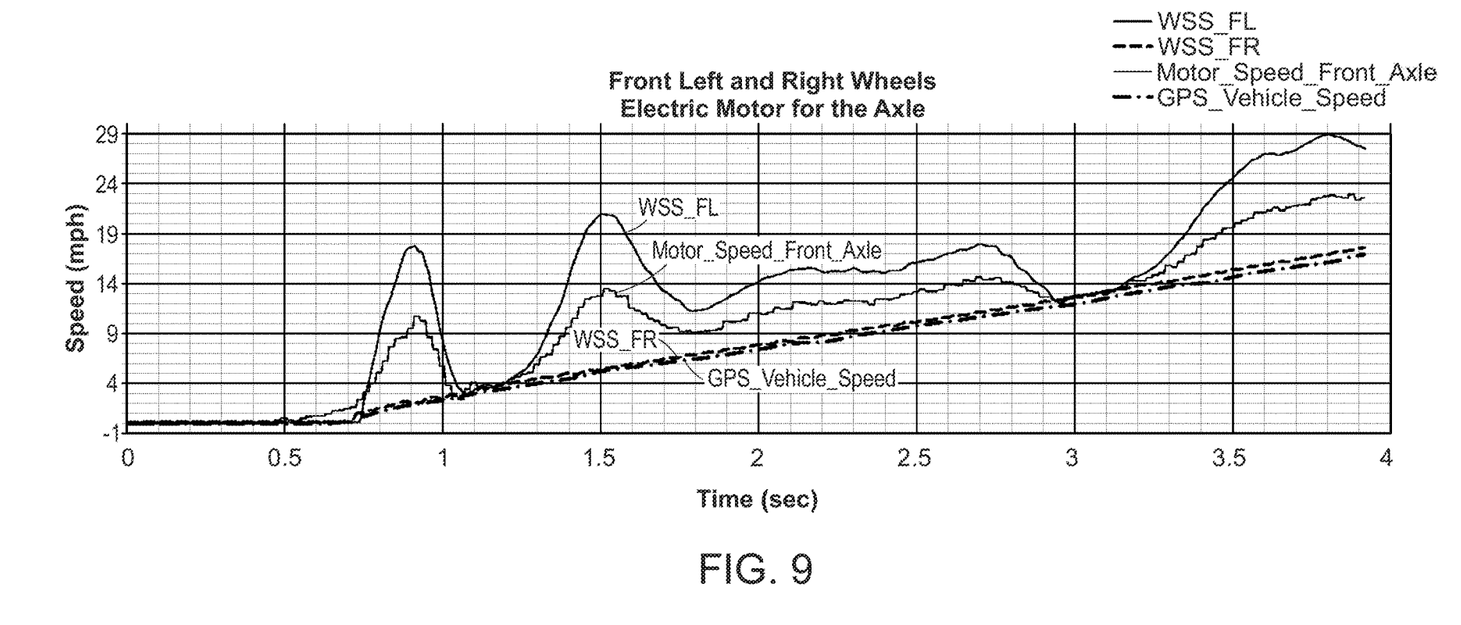
FIG. 9 is a graph of vehicle speed versus time illustrating the wheel speed for front left and right wheels having a common electric motor and shared axle, the electric motor speed and vehicle speed.

FIG. 7 is a graph of vehicle speed versus time illustrating the wheel speed, the electric motor speed and vehicle speed for a rear left wheel having a dedicated electric motor. FIG. 8 is a graph of vehicle speed versus time illustrating the wheel speed, the electric motor speed and vehicle speed for a rear right wheel having a dedicated electric motor. FIG. 9 is a graph of vehicle speed versus time illustrating the wheel speed for front left and right wheels having a common electric motor and shared axle, the electric motor speed and vehicle speed. These graphs illustrate that for normal driving speeds (e.g., greater than 5 kilometers per hour), the output of the wheel speed sensor 22 closely corresponds to the output of the electric motor speed sensor 30. In addition, these graphs illustrate that there are slight differences between the output of the wheel speed sensor 22 and the output of the electric motor speed sensor 30 at low speeds (e.g., less than 2 kilometers per hour. However, the output of the electric motor speed sensor 30 is more accurate and reliable at low speeds, and wheel rotation can be accurately measured by the electric motor speed sensor 30 much earlier than by the wheel speed sensor 22, whereby using the electric motor speed sensor at low speeds provides more timely and accurate control of the vehicle by the control systems.

Figure 10:
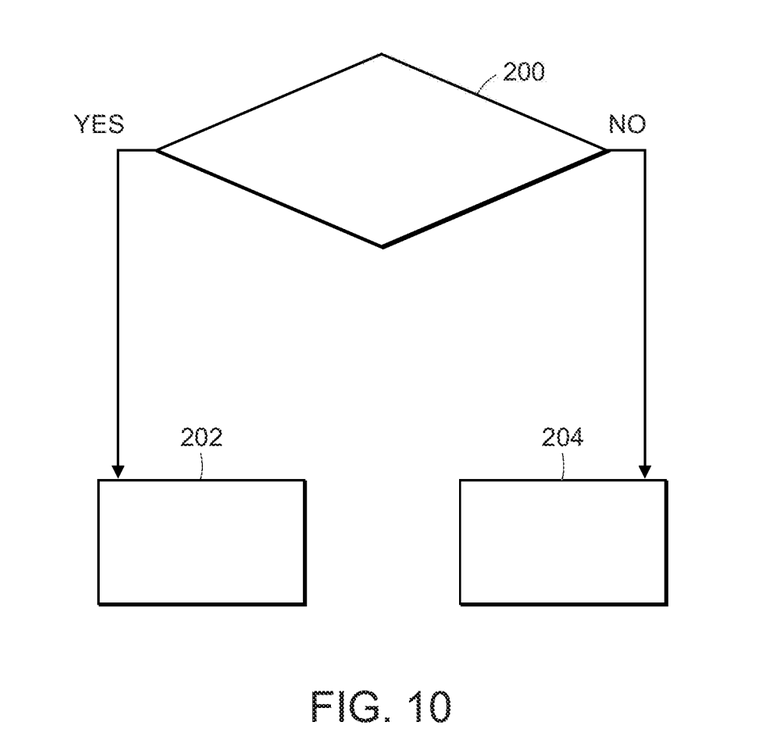
FIG. 10 is a flow chart illustrating a method of controlling the vehicle powertrain via the vehicle control system.

Referring to FIG. 10, a method of controlling the vehicle powertrain 11 via the vehicle control system 10 to use the electric motor speed sensor 30 as a back-up sensor for the wheel speed sensor 22 includes the following method steps: Initially, the electronic stability control unit determines whether the wheel speed sensor 30 is providing an output signal in a predetermined range, for example in a range corresponding to a normal operating range of the wheel speed sensor 22 (step 200). This determination may occur prior to a determination of wheel slip of any of the wheels. If the vehicle electronic stability control unit 14 determines that the wheel speed sensor 22 is providing an output signal in the predetermined range, the wheel speed sensor 22 is considered to be operating normally. In this case, the electronic stability control unit 14 controls the electronic stability control devices, including one or more of antilock braking, traction control, stability control and/or other vehicle control functions, based on an output of the wheel speed sensor 22 and other sensors in accordance with known operation of these systems and devices (step 202).

If the vehicle electronic stability control unit 14 determines that the wheel speed sensor is not providing an output signal and/or is not providing an output signal in the predetermined range (e.g., in a range corresponding to a normal operating range of the wheel speed sensor 22), the wheel speed sensor 22 is considered to be operating abnormally. In this case, the electronic stability control unit 14 controls the electronic stability control devices, including one or more of antilock braking, traction control, stability control and/or other vehicle control functions, based on an output of the electric motor speed sensor and other sensors in accordance with known operation of these systems and devices (step 204).

Although the illustrated embodiments include the powertrain electronic control unit 12 that is separate from the electronic stability control unit 14 and communicates with the electronic stability control unit 14 via a communication bus, the vehicle control system 10 is not limited to this configuration. For example, in some embodiments, the powertrain electronic control unit 12 and the electronic stability control unit 14 may be included within a centralized vehicle control unit that includes most or all vehicle electronic control units. In such a centralized vehicle control unit, the powertrain electronic control unit 12 and the electronic stability control unit 14 may be implemented as individual sub-processors or control systems controlled by a higher level processor or control system, or alternatively may be fully integrated within a single processor or control system.

Selective illustrative embodiments of the vehicle control system are described above in some detail. It should be understood that only structures considered necessary for clarifying the vehicle control system have been described herein. Other conventional structures, and those of ancillary and auxiliary components of the vehicle control system, are assumed to be known and understood by those skilled in the art. Moreover, while a working example of the vehicle control system have been described above, the vehicle control system is not limited to the working examples described above, but various design alterations may be carried out without departing from the vehicle control system as set forth in the claims.

I claim:

1. A vehicle control system comprising
   powertrain electronic control unit;
   an electronic stability control system including an electronic stability control unit that is connected to the powertrain electronic control unit via a vehicle communication bus,
   a wheel;
   a wheel speed sensor that is configured to detect a speed of the wheel;
   an electric motor that is configured to drive the wheel; and
   an electric motor speed sensor that is configured to detect the speed of the electric motor;
   wherein
   the electronic stability control unit determines whether the wheel speed sensor is providing an output signal in a predetermined range, and
   when the wheel speed sensor is providing an output signal iii a predetermined range, the electronic stability control unit controls the electronic stability control system based on an output of the wheel speed sensor, and
   when the wheel speed sensor is one of
      a) not providing an output signal, and
      b) not providing an output signal in a predetermined range,
   the electronic stability control unit controls the electronic stability control system based on an output of the electric motor speed sensor.

2. The vehicle control system of claim 1, wherein
   the wheel speed sensor is electrically connected to the electronic stability control unit via a communication line that is separate from the vehicle communication bus, and
   the electric motor speed sensor is electrically connected to the powertrain electronic control unit via the vehicle communication bus.

3. The vehicle, control system of claim 1, wherein the wheel speed sensor includes
   a tone ring having a plurality of metal teeth and that rotates concurrently with the rotation of the wheel, and
   a magnetic sensor that is configured to detect the teeth of the tone ring during rotation of the wheel.

4. The vehicle control system of claim 1 wherein the electric motor speed sensor includes a sensor that configured to detect both a rotation of a rotor of the electric motor and a direction of rotation of the rotor of the electric motor.

5. The vehicle control system of claim 1 wherein the electric motor speed sensor is a Hall effect sensor.

6. The vehicle control system of claim 1 wherein the vehicle communication bus is a controller area network vehicle bus.

7. The vehicle control system of claim 1, wherein the electronic stability control system comprises at least one of
   an antilock braking system including an antilock braking system control unit,
   a traction control system including a traction control system control unit, and
   a vehicle dynamic control system luding a vehicle dynamic control system control unit.

8. The vehicle control system of claim 1, wherein the electric motor is controlled by the powertrain electronic control unit via the vehicle communication bus.

9. The vehicle control system of claim 1, comprising a battery that supplies power to the electric motor.

10. A method of controlling a vehicle control system, the vehicle control system comprising
a powertrain electronic control unit;
an electronic stability control system including an electronic stability control unit that is connected to the powertrain electronic control unit via a vehicle communication bus,
a wheel;
a wheel speed sensor that is configured to detect a speed of the wheel;
an electric motor that is configured to drive the wheel; and
an electric motor speed sensor that is configured to detect the speed of the electric motor;
the method comprising
determining via the electronic stability control unit whether the wheel speed sensor is providing an output signal in a predetermined range, and
when the electronic stability control unit determines that the wheel speed sensor is providing an output signal in a predetermined range, using the electronic stability control unit to control the electronic stability control system based on an output of the wheel speed sensor, and
when the electronic stability control unit determines that the wheel speed sensor is one of
a) not providing an output signal, and
b) not providing an output signal in a predetermined range,
using the electronic stability control unit to control the electronic stability control system based on an output of the electric motor speed sensor.

11. A vehicle control system comprising
a vehicle control unit that provides and controls a powertrain electronic control system, and an electronic stability control system,
a wheel;
a wheel speed sensor that is configured to detect a speed of the wheel;
an electric motor that is configured to drive the wheel; and
an electric motor speed sensor that is configured to detect the speed of the electric motor;
wherein
the vehicle control unit determines whether the wheel speed sensor is providing, an output signal in a predetermined range, and
when the wheel speed sensor is providing an output signal in a predetermined range, the vehicle control unit controls the electronic stability control system based on an output of the wheel speed sensor, and
when the wheel speed sensor is one of
a) not providing an output signal, and
b) not providing an output signal in a predetermined range,
the vehicle control unit controls the electronic stability control system based on an output of the electric motor speed sensor.

* * * * *

UNITED STATES PATENT AND TRADEMARK OFFICE
CERTIFICATE OF CORRECTION

PATENT NO. : 10,913,449 B2
APPLICATION NO. : 16/170838
DATED : February 9, 2021
INVENTOR(S) : David Safstrom It is certified that error appears in the above-identified patent and that said Letters Patent is hereby corrected as shown below:

In the Claims

In Claim 1, at Column 6, Line 11: "powertrain electronic control unit;" should read --a powertrain electronic control unit;--.

In Claim 1, at Column 6, Lines 24-25: "an output signal iii a predetermined range" should read --an output signal in a predetermined range--.

In Claim 3, at Column 6, Line 45: "The vehicle, control system of claim 1, wherein" should read --The vehicle control system of claim 1, wherein--.

In Claim 7, at Column 6, Line 66: "system luding" should read --system including--.

In Claim 11, at Column 8, Line 8: "electronic control system, and" should read --electronic control system and--.

In Claim 11, at Column 8, Line 18: "providing, an output" should read --providing an output--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*